(12) United States Patent
Nicholls et al.

(10) Patent No.: US 8,867,520 B2
(45) Date of Patent: Oct. 21, 2014

(54) USING A NETWORK FREQUENCY REFERENCE TO AUGMENT TIMING SYNCHRONIZATION IN A WIRELESS BASE STATION

(76) Inventors: Charles Nicholls, Nepean (CA); David Steer, Nepean (CA); Bradley John Morris, Ottawa (CA)

( * ) Notice: Subject to any disclaimer, the term of this patent is extended or adjusted under 35 U.S.C. 154(b) by 1407 days.

(21) Appl. No.: 12/044,279

(22) Filed: Mar. 7, 2008

(65) Prior Publication Data

US 2009/0225743 A1 Sep. 10, 2009

(51) Int. Cl.
- *H04J 3/06* (2006.01)
- *H04W 56/00* (2009.01)
- *H04W 84/04* (2009.01)
- *H04W 92/04* (2009.01)

(52) U.S. Cl.
CPC .............. *H04W 56/00* (2013.01); *H04J 3/0647* (2013.01); *H04J 3/0688* (2013.01); *H04W 84/045* (2013.01); *H04W 92/045* (2013.01); *H04J 3/0644* (2013.01); *H04J 3/0661* (2013.01)
USPC ........... 370/350; 370/401; 370/504; 370/516; 370/524; 375/376; 455/260

(58) Field of Classification Search
USPC .................. 370/350, 503, 509–520; 375/376; 331/18, 25, 44, 65, 66, 176; 327/147; 455/260

See application file for complete search history.

(56) References Cited

U.S. PATENT DOCUMENTS

| | | | |
|---|---|---|---|
| 6,236,359 B1 * | 5/2001 | Watters et al. | 342/357.29 |
| 6,671,343 B1 * | 12/2003 | Ito | 375/376 |
| 6,711,230 B1 | 3/2004 | Nicholls et al. | |
| 7,015,762 B1 * | 3/2006 | Nicholls et al. | 331/10 |
| 7,043,651 B2 | 5/2006 | Aweya et al. | |
| 7,558,356 B2 * | 7/2009 | Pollman et al. | 375/367 |
| 2002/0001299 A1 * | 1/2002 | Petch et al. | 370/350 |
| 2010/0118846 A1 * | 5/2010 | Moeller | 370/338 |

OTHER PUBLICATIONS

Terasync, "GPTiMe: Stratum 1, 2, 3 or 3E, GPS Integrated, Feature-Rich Synchronizer", http://www.terasync.net/pdf/GPTime2008.pdf.

* cited by examiner

*Primary Examiner* — Alvin Zhu
(74) *Attorney, Agent, or Firm* — Womble Carlyle Sandridge & Rice LLP (57) ABSTRACT

A method and an apparatus for augmenting timing synchronization in a base station using backhaul network frequency synchronization are provided. When in a first mode an external time epoch reference synchronized with system time is used to synchronize the base station to system time. When in a second mode a network frequency reference recovered from a backhaul network link is used to maintain the timing synchronization.

23 Claims, 5 Drawing Sheets

USING A NETWORK FREQUENCY REFERENCE TO AUGMENT TIMING SYNCHRONIZATION IN A WIRELESS BASE STATION

FIELD OF THE INVENTION

The present invention relates to time synchronization in wireless communications.

BACKGROUND

With increased interest in femtocells or Access Point Base Stations (APBS), i.e., smaller scale cellular base stations typically designed for use in residential or small business environments, there has been growing interest in reducing the cost associated with base station components, while maintaining or improving their performance. Cost is of a particular concern, as residential or small business users typically cannot afford the expense of conventional full base station implementations.

Femtocells typically connect to a service provider's network via broadband backhaul connections. A femtocell allows service providers to extend service coverage indoors, which is particularly useful where access would otherwise be limited or unavailable. The femtocell incorporates the functionality of a typical base station but extends it to allow a simpler, self contained deployment; for example, a Universal Mobile Telephone System (UMTS) femtocell may contain a base transceiver station (Node B), a Radio Network Controller (RNC) and a General Packet Radio Service Support Node (GSN) with Ethernet for backhaul. Femtocells are not limited to UMTS, the concept is applicable to all mobile radio systems, including GSM, CDMA-2000, TD-SCDMA and WiMAX solutions.

For a user, the attractions of a femtocell are improvements to both coverage and capacity, especially indoors. There may also be opportunity for new services and reduced cost. The cellular operator also benefits from the improved capacity and coverage but also can potentially reduce both capital expenditure and operating expense. However, due to timing synchronization requirements, such as holdover time, i.e., the time over which the femtocell stays synchronized with the main network without re-synchronizing, conventional femtocell implementations have utilized expensive oven controlled crystal oscillators (OCXOs), such as single oven oscillators costing in excess of $50, or double oven oscillator technology costing $300 or more.

Reductions in timing module component costs without significantly impacting performance would be beneficial to not only femtocell applications, but could potentially benefit any base station application.

The use of femtocells or other access point base stations indoors has conventionally meant that in applications in which the femtocell or other access point base station must be able to receive Global Navigation Satellite System (GNSS) signals, an antenna that is able to receive the GNSS signals must typically be located externally to the building in which the femtocell or base station is located, as direct reception of GNSS signals is often poor in indoor environments.

SUMMARY OF THE INVENTION

According to one broad aspect of the present invention, there is provided a method in a base station comprising: deriving a local network frequency reference from output of a local oscillator; while in a first mode: adjusting the local oscillator based on an external time epoch reference; and if a network frequency reference is available, determining frequency corrections to account for frequency offsets between the network frequency reference and the local network frequency reference; and while in a second mode: if the network frequency reference is available, adjusting the local oscillator based on the frequency corrections determined while in the first mode and frequency offsets between the network frequency reference and the local network frequency reference.

In some embodiments, the method further comprises operating in the second mode when the external time epoch reference is unavailable.

In some embodiments, determining frequency corrections comprises: training a network clock model to predict frequency corrections to account for frequency offsets between the network frequency reference and the local network frequency reference, and adjusting the local oscillator based on the frequency corrections determined while in the first mode and frequency offsets between the network frequency reference and the local network frequency reference comprises adjusting the local oscillator based on the network clock model and frequency offsets between the network frequency reference and the local network frequency reference.

In some embodiments, the method further comprises: when in the first mode: training an oscillator model for frequency drift of the local oscillator based on at least one of time and temperature; and when in the second mode: if the network frequency reference is unavailable: if the oscillator model has been sufficiently trained while in the first mode, adjusting the local oscillator based on the oscillator model; otherwise, maintaining a last frequency correction applied to the local oscillator.

In some embodiments, training an oscillator model for frequency drift of the local oscillator based on at least one of time and temperature comprises: measuring temperature of the local oscillator, and adjusting the local oscillator based on the oscillator model during the second mode comprises calculating frequency corrections for the local oscillator based on the temperature of the local oscillator using the oscillator model.

In some embodiments, training an oscillator model for frequency drift of the local oscillator based on at least one of time and temperature comprises: measuring elapsed time in the second mode, and adjusting the local oscillator based on the oscillator model during the second mode comprises calculating frequency corrections for the local oscillator based on the elapsed time in the second mode using the oscillator model.

In some embodiments, adjusting the local oscillator based on an external time epoch reference comprises: receiving the external time epoch reference; and phase-locking the local oscillator to the external time epoch reference.

In some embodiments, receiving the external time epoch reference comprises: receiving a Global Navigation Satellite System (GNSS) signal; and recovering a GNSS timing signal from the GNSS signal.

In some embodiments, phase-locking the local oscillator to the external time epoch reference comprises: deriving a local frequency reference from the output of the local oscillator; determining phase corrections between the local frequency reference and the GNSS timing signal; and adjusting the local oscillator based on the phase corrections.

In some embodiments, determining frequency corrections to account for frequency offsets between the network frequency reference and the local network frequency reference comprises recovering the network frequency reference from a backhaul network link.

In some embodiments, receiving the external time epoch reference further comprises: receiving GNSS data on the backhaul network link, and recovering the GNSS timing signal from the GNSS signal comprises recovering the GNSS timing signal from at least one of: the GNSS signal and the GNSS data received on the backhaul network link.

In some embodiments, the method further comprises: determining location information from the GNSS signal; and determining a delay from a main base station using the location information.

In some embodiments, receiving the external time epoch reference comprises: receiving a signal from another base station.

In some embodiments, receiving a signal from another base station comprises receiving a CDMA coded GNSS-like signal from another base station.

In some embodiments, the base station comprises a femtocell and receiving the signal from another base station comprises receiving the signal from a main base station.

In some embodiments, the base station operates in time division duplexing mode, and wherein phase-locking the local oscillator to the external time epoch reference comprises: phase-locking the local oscillator to the external time epoch reference using the external time epoch reference when not transmitting.

In some embodiments, the method further comprises: while in the first mode: transmitting time stamp packets over the backhaul network link.

According to another broad aspect of the present invention, there is provided an apparatus in a base station, comprising: a network frequency reference block that while a network frequency reference is available recovers the network frequency reference; an external time epoch receiver that while an external time epoch reference is available recovers the external time epoch reference; and a local time base controller comprising a local oscillator and a frequency/time lock controller, wherein local time base controller derives a local network frequency reference from output of the local oscillator; and while in the first mode, the frequency/time lock controller: adjusts the local oscillator based on the external time epoch reference; and if a network frequency reference is available, determines frequency corrections to account for frequency offsets between the network frequency reference and the local network frequency reference; and while in the second mode, the frequency/time lock controller: if the network frequency reference is available, adjusts the local oscillator based on the frequency corrections determined while in the first mode and frequency offsets between the network frequency reference and the local network frequency reference.

In some embodiments, the apparatus operates in the second mode when the external time epoch reference is unavailable.

In some embodiments, the frequency/time lock controller comprises a network clock model; and while in the first mode, the frequency/time lock controller: trains the network clock model to predict frequency corrections to account for frequency offsets between the network frequency reference and the local network frequency reference; and adjusts the local oscillator based on the network clock model and frequency offsets between the network frequency reference and the local network frequency reference.

In some embodiments, the frequency/time lock controller comprises an oscillator model; and while in the first mode, the frequency/time lock controller: trains the oscillator model for frequency drift of the local oscillator based on at least one of time and temperature; and while in the second mode, the frequency/time lock controller: if the network frequency reference is unavailable: if the oscillator model has been sufficiently trained while in the first mode, adjusting the local oscillator based on the oscillator model; otherwise, maintaining a last frequency correction applied to the local oscillator.

In some embodiments, the external time epoch receiving unit comprises at least one of: a) an assisted Global Navigation Satellite System (GNSS) receiver that recovers the external time epoch reference by receiving at least one of: a GNSS signal from at least one Global Navigation Satellite; and GNSS data received on the backhaul network link; and b) a portion of a wireless transceiver that the base station also uses for communication with mobile terminals and other base stations that recovers the external time epoch reference by receiving a CDMA coded GNSS-like signal from at least one other base station.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying drawings, in which.

DETAILED DESCRIPTION

In the following detailed description of sample embodiments, reference is made to the accompanying drawings, which form a part hereof, and in which is shown by way of illustration specific sample embodiments in which the present invention may be practiced. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Various methods and apparatus are provided to augment oscillator stability for time synchronization of a base station to system time for the purposes of holdover and locked mode operation. An external time epoch reference, such as a global navigation satellite system (GNSS) signal, when available, is used to align the oscillator with system time (external time epoch) and during times when the external time epoch reference is not available, a stable network frequency reference is used to augment the stability of the oscillator to maintain alignment with system time. By using the stable network frequency reference to augment the stability of the oscillator, it may be possible to implement a local oscillator using a lower cost component, such as a temperature compensated crystal oscillator (TCXO), which typically costs less than $10, rather than a more expensive oven controlled crystal oscillator, thereby reducing the total implementation costs associated with a timing module.

In low cost implementations, indoor Global Positioning System (GPS) or other global navigation satellite systems may be used to provide the external time epoch reference. Indoor GPS is subject to sporadic operation owing to variable satellite visibility conditions. The sporadic operation can be compensated for in some embodiments by using GPS only to provide the time epoch, while frequency lock is predominantly a function of a network derived clock.

Figure 1:
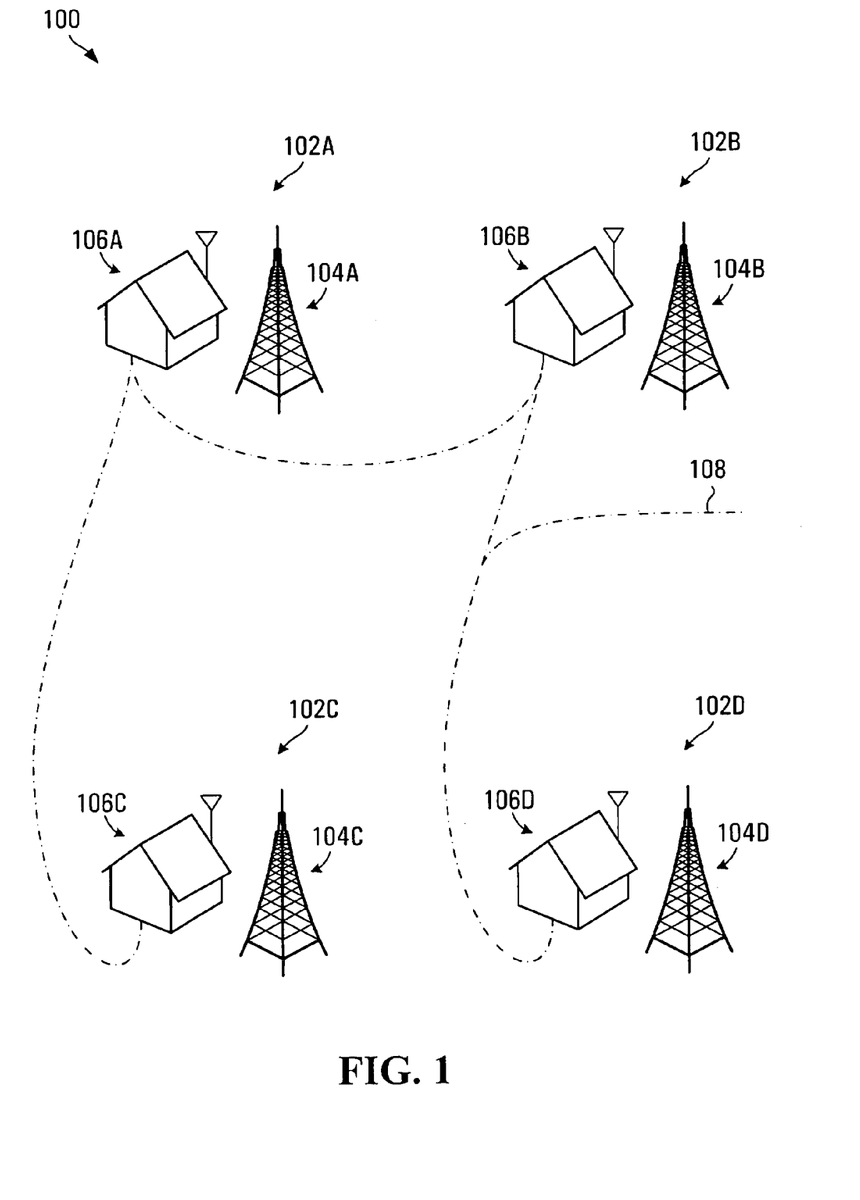
FIG. 1 is a schematic diagram of an arrangement of communications network components in a cellular mobile system in accordance with an embodiment of the invention.

FIG. 1 is a schematic diagram of an arrangement of cell-sites in a cellular mobile system 100 in accordance with an embodiment of the invention. The system 100 includes four cell-sites 102A, 102B, 102C and 102D that are linked by a communications network 108 such as Ethernet. Each cell-site 102A, 102B, 102C and 102D includes a cell-site transceiver 104A, 104B, 104C and 104D, respectively, and an external time epoch receiving unit 106A, 106B, 106C and 106D, respectively.

In operation, the cell-site transceivers 104A, 104B, 104C and 104D communicate wirelessly with user equipment (UE), such as mobile stations (not shown) that are within their respective coverage areas (not shown). In some implementations, the cell-sites may have overlapping coverage areas. The cell-sites 102A, 102B, 102C and 102D communicate with one another and potentially with other portions of a service provider's network via the backhaul communications network 108. Typically, all cell-sites in a mobile communications system share a common time scale in order to allow synchronous wireless communication. For example, the base stations in a code division multiple access (CDMA) based communications systems are time synchronized in order to allow handoff of mobile stations between cell-sites. The external time epoch receiving units 106A, 106B, 106C and 106D receive time epoch reference signals from an external source (not shown) that provides the common time scale or time epoch. This source may be a satellite navigation system (e.g. GPS) or it could be a terrestrial radio signal such as a television broadcast, or the signals of other cell sites in the cellular radio communications network that the cell-sites 102A, 102B, 102C and 102D are a part of. The interconnecting backhaul communications network 108 could take many forms including optical or wired cables, and signal formats including T1/E1 or Ethernet signals or protocols. The interconnecting backhaul communications network may connect to an external network (not shown) as part of the cellular mobile system 100.

The individual cell-sites 102A, 102B, 102C and 102D use signals from the backhaul communications network 108 together with signals from the external time epoch receivers 106A, 106B, 106C and 106D to set their accurate frequency of operation and to synchronise their timing with system time. The use of the dual information sources (external epoch receiver and backhaul network frequency reference) allows low cost oscillators to be used in the cell-sites, while still achieving frequency and timing accuracy together with the increased reliability in the event of failure of either the timing epoch reference or the backhaul network signals.

The external time epoch receiving units 106A, 106B, 106C and 106C may, for example, use the GPS navigation system signals to establish the timing epoch (synchronize with system time, e.g. through the 1 pulse per second signal that is synchronised to Greenwich Mean Time (GMT)). As the GPS signals (external time epoch reference signals) may sometimes be unavailable at individual sites due to terrain blocking (or other obstructions), the backhaul communication link signal frequency of the backhaul communications network 108 may be used to maintain control of timing at the cell site during intervals of external time epoch reference signal unavailability. Backhaul communication links typically provide an extremely stable and accurate network frequency reference. For example, some backhaul network frequency signals may have traceability through T1/E1 leased circuit switched lines to a stratum 1 frequency standard having stability of $10^{-11}$ parts relative to the Coordinated Universal Time (UTC). If the frequency standard is locked to the system time scale such as GPS then the frequency standard will have no frequency accuracy error relative to GPS. As frequency is defined as occurrences per unit time, an accurate frequency reference, such as that typically provided on a backhaul network link can potentially be used to accurately track the passing of time, i.e., maintain time synchronization with a time epoch reference (e.g. system time).

If the interconnecting backhaul network 108 is for example T1 or E1 standards based, then the local cell site 102A, 102B, 102C or 102D may derive an accurate network frequency reference from the backhaul communications network line signal. Alternatively, if the backhaul communications network line signal is, for example, an Ethernet signal, the cell-sites may extract the network frequency reference from time stamp packets sent over the backhaul communications network 108 from a time synchronisation node (not shown). This time synchronization node may be an external server attached to the backhaul communications network 108, or it could be another (some or all) of the cell-sites 102A, 102B, 102C and 102D that are able to receive external time epoch reference signals and send time stamp packets via the backhaul communications network 108 when in lock with the external time epoch reference, i.e. with system time.

The external time epoch reference signal could be provided by any of several sources. A Global Navigation Satellite System (GNSS) signal, such as GPS, is one common source. However, other broadcast radio signals could be used including the signals of one or more of the cell-sites 102A, 102B, 102C or 102D or other cell-sites (not shown) of the mobile radio communications system 100. If these are used, the system 100 becomes "self synchronizing". Reception of GNSS signals, such as GPS signals, typically requires a separate antenna and receiver to receive and process the GPS signals. The "self synchronizing" configuration in which the broadcast radio signals of the mobile communications system 100 are used to establish the time epoch reference has the advantage that it is independent of outside sources and may not require special receivers or antennas at the cell-sites 102A, 102B, 102C and 102D, as the receiver portion of the cell-site transceivers 104A, 104B, 104C and 104D may also be used for establishing the time epoch reference.

Rather than using "true" GNSS signals to convey the time epoch, some femtocell embodiments use "GNSS-like" signals as an underlay in the transmission channel of the main base station. The GNSS-like signals are CDMA coded transmissions that can coexist "underneath" some system's signals. In many cases this in-band signal will be stronger than the "true" GNSS signals. In this case, the GNSS-like signal is decoded by the GNSS receiver and may be either used alone for time epoch information, or used in combination with other "true" GNSS signals or sources of time epoch. U.S. Pat. No. 6,236,359, which is incorporated herein by reference in its entirety, describes in-band GPS signals used for location services for mobile terminals.

If the cell site is a femtocell and operates in time division duplexing (TDD) mode, the same transceiver that is used for the femtocell's coverage could be used as the epoch synchronization receiver for main base station signals. The femtocell would then operate in two modes, one being synchronization mode, the other being femtocell traffic mode (i.e., when it handles local traffic from mobile stations)

Alternatively, if the cell site is a femtocell that operates in frequency division duplexing (FDD) mode, there is no need for a duplexer for femtocell self synchronizing, as when the femtocell is operating in synchronization mode it does not need to also be transmitting.

While FIG. 1 includes four cell-sites 102A, 102B, 102C and 102D, linked by one communications network 108, more generally, embodiments of the present invention may include any number of cell-sites that may each have any number of links to any number of communications networks.

In FIG. 1, the external time epoch receiving units 106A, 106B, 106C and 106D are shown as being separate from the cell-site transceivers. In some embodiments, the external time epoch receiving units 106A, 106B, 106C and 106D are integrated into the cell-site transceivers.

Figure 2:
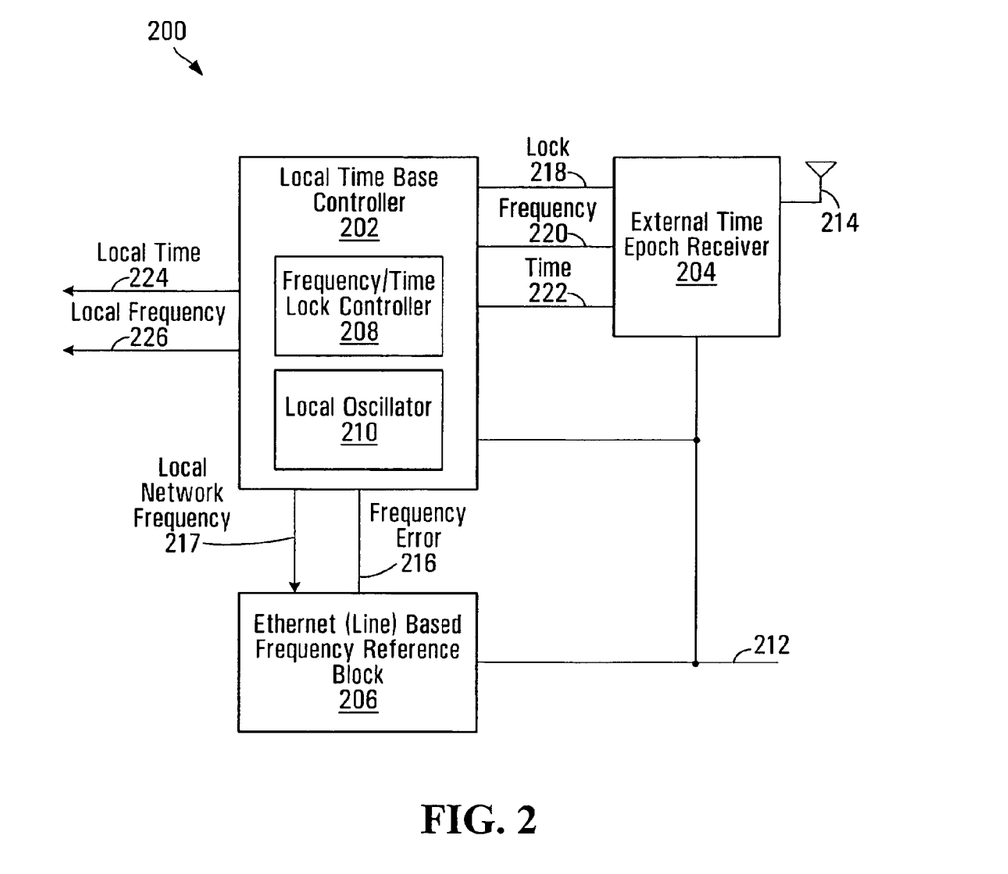
FIG. 2 is a block diagram of base station components arranged according to an embodiment of the invention.

FIG. 2 is a block diagram of an arrangement 200 of cell-site synchronisation system elements according to an embodiment of the present invention that might, for example, be implemented in the cell-sites 102A, 102B, 102C and 102D in the system 100 shown in FIG. 1.

In FIG. 2, the arrangement 200 includes three basic blocks: an Ethernet Based (or other line based) Frequency Reference (EBFR) block 206; an External Time Epoch Receiver (ETER) 204; and a Local Time Base Controller (LTBC) 202. The LTBC 202 includes a frequency/time lock controller 208 and a local oscillator 210. The LTBC is functionally connected to the EBFR block 206 and the ETER 204. A backhaul network link 212 to a backhaul line network (not shown) is functionally connected to the LTBC 202, the ETER 204 and the EBFR block 206. The ETER 204 is also functionally connected to an antenna system 214. The LTBC 202 has a first output for a local time 224 and a second output for a local frequency 226 derived from output of the local oscillator 210. The LTBC 202 also has a third output for a local network frequency 217 that is derived from the output of the local oscillator 210. The local network frequency 217 generated by the LTBC 202 is provided to the EBFR block 206. The local time 224 and the local frequency 226 generated by the LTBC 202 may be used elsewhere in the base station system in which the arrangement 200 is implemented.

In operation, the EBFR block 206 receives network frequency information from the network communications link 212 and measures the frequency error 216 between the network line frequency and the local network frequency 217 derived from output of the local oscillator 210.

The EBFR 206 may receive a network frequency reference directly from the backhaul network communications line signal (e.g. T1/E1) if the line is a time based transmission system. If the line signals are packet based (e.g. Ethernet) then the EBFR 206 may receive time stamp packets and derive the frequency error 216 based on the time stamp packets, as described in detail later with reference to FIG. 3. The time stamp packets may come from another node in the communications line network, such as another cell site or a dedicated time synchronous server. In some implementations, the time stamp packets may be sent from multiple other nodes in the communications line network (not shown). In general, the network frequency reference could be any sources of a stable frequency reference such as digital subscriber line (DSL), T1/E1, optical interface fibre, Ethernet or some other form of digital communications.

The ETER 204, if it is global navigation satellite system based (e.g. GPS) may also receive satellite data via the communications line network link 212 (e.g. Ethernet packets) that assist in the reception of satellite signals. This is known as assisted GPS (A-GPS) reception. However, the ETER 204 may also operate satisfactorily without the use of network assistance information. If the ETER 204 is synchronising based on signals from other cell sites in a mobile communications network, then its receiver (not shown) may be a part of the transceiver used for the mobile communications network, i.e., the antenna system 214 may be the same antenna used for receiving mobile communications network signals. In this alternative, the ETER 204 may work independently, or it may receive assistance information via the communications line network link 212. Such assistance information may include, for example, timing errors measured by other cell sites of the individual cell site signals.

The LTBC 202 operates to set the local cell site frequency 226 and time (epoch) 224 based on either the measurements 220, 222 provided by the ETER 204 or the network frequency error measurement 216 provided by the EBFR block 206, depending on the availability of an external epoch time reference via the ETER 204. A lock signal 218 from the ETER 204 is used by the LTBC 202 to indicate the validity of the frequency 220 and time 222 signals from the ETER 204 (as sometimes the ETER 204 may be unable to receive signals and hence is unable to provide proper time 222 and frequency 224 signals).

When the lock signal 218 is asserted, the frequency/time lock controller 208 uses a time/frequency control algorithm to make corrections to the local time 224 and the local frequency 226 of the local oscillator 210 based on the frequency 220 and a time 222 from the ETER 204, and uses the frequency error 216 to determine frequency corrections to account for frequency offsets between the network frequency reference and the local network frequency 217, and hence between the local time 224 and network time.

When external time epoch reference signals are not available, and the ETER 204 cannot produce a valid frequency 208 and time 222, the lock signal 218 is de-asserted, and the LTBC 202 uses the time/frequency control algorithm to make corrections to the local time 224 and the local frequency 226 based on the frequency error 216 and the frequency corrections determined while the lock signal 218 was asserted, i.e., when the external time epoch reference was available and the local oscillator 210 was time synchronized with the external time epoch reference.

When a network frequency reference can be determined from line signals received via the network backhaul link 212 and a valid external time epoch reference has been determined from external epoch time reference signals received via the ETER 204 and the frequency/time lock controller 208 has achieved synchronisation of the Local Oscillator 210 with the external time epoch reference, the LTBC 202 may send time stamp packets (or other synchronising signals) over the interconnecting communications network via the backhaul network link 212 to be used by other nodes in the network for their synchronisation. This technique has the advantage that there is no need for a dedicated time synchronisation node in the network to issue the time stamp packets. This reduces the cost of deployment and also improves reliability as any (and all) cell sites that are in synchronisation can supply the needed information to keep the network operating.

In some embodiments, information from the external time epoch receiver, such as its location when the external time epoch receiver is GPS-based, is used by the base station to signal its location to the network, for example, as a licensed transmitter station, for power or scheduling/timing control of its signals to mitigate interference with main base stations in femtocell implementations, or as information to be sent to locally attached subscribers or the network to provide location information for either commercial or emergency response purposes.

The information on the location of the external time epoch receiver could be used to determine the distance from the main base station in femtocell implementations. Knowledge of the distance to the main base station could then be used to calculate the offset for the femtocell's transmission timing from the signals received over the air to properly align with the base station at its location. If this location information was not available from the external time epoch receiver, this location information could be entered in the femtocell at installation time. The offset could also be set by the use of a timing advance protocol between the main base station and the femtocell similar to that used to align transmissions in mobile and relay stations in IEEE 802.16.

Figure 3:
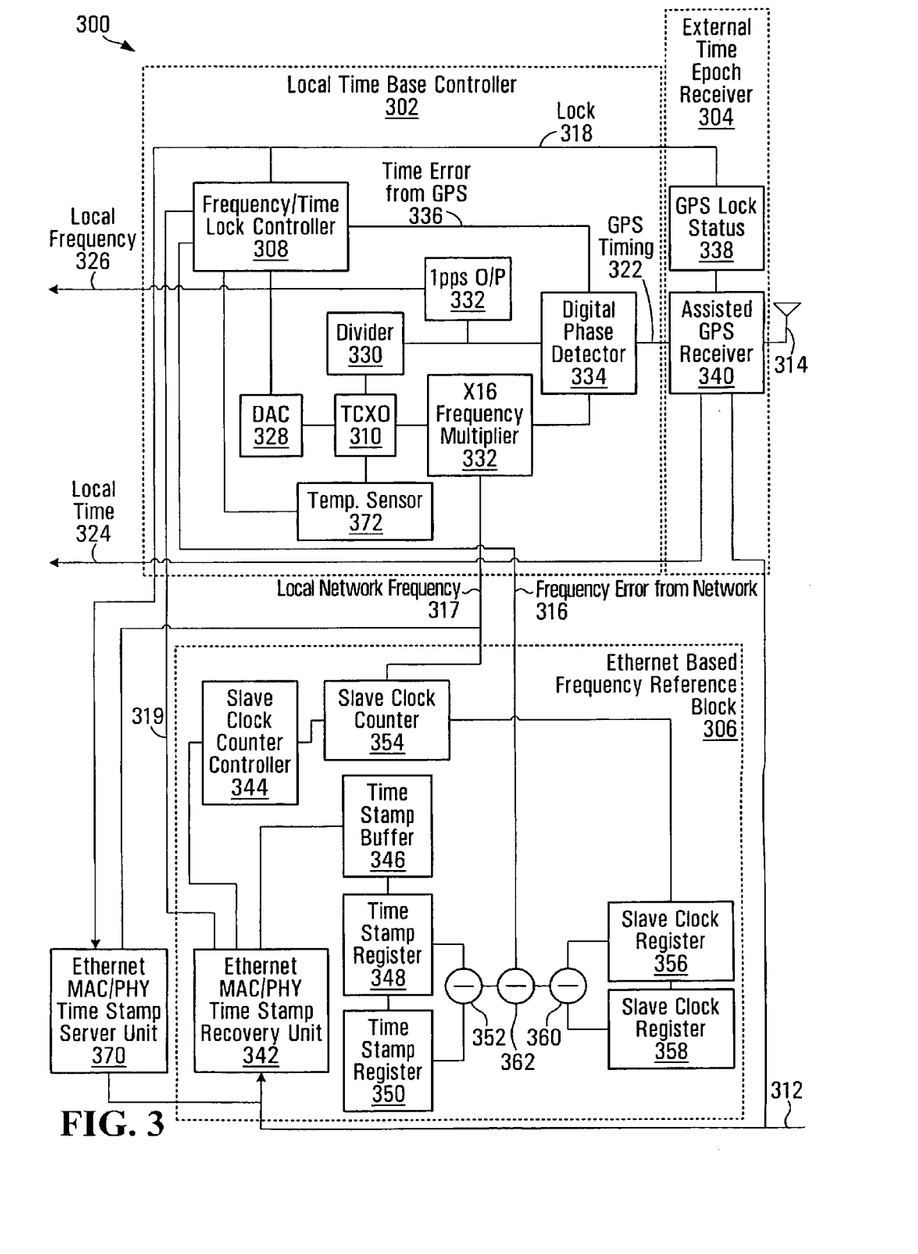
FIG. 3 is a block diagram of base station components arranged according to another embodiment of the invention.

FIG. 3 is another block diagram of an arrangement 300 of time synchronization elements in a base station according to another embodiment of the present invention. The arrangement 300 shown in FIG. 3 is similar to the arrangement 200 shown in FIG. 2, but provides a more detailed implementation of the timing synchronisation blocks, that should not be considered limiting, and is provided by way of example only.

The arrangement 300 shown in FIG. 3 includes an LTBC 302, an ETER 304 and an EBFR block 306. A network link 312 is functionally connected to the ETER 304 and the EBFR block 306 and an antenna system 314 is functionally connected to the ETER 304.

Some embodiments, as shown in FIG. 3, may also include a MAC/PHY time stamp server, such as the Ethernet MAC/PHY time stamp server unit 370, which is functionally connected to the network link 312 and the LTBC 302.

The LTBC 302 has a 1 pulse per second (1 pps) output 332 that outputs a local frequency reference signal 326. This local frequency reference 326 may be used elsewhere in the base station for timing purposes, such as frame alignment. The LTBC 302 has a second output that outputs a Local Network Frequency 317. The second output of the LTBC 302 is functionally connected to the EBFR 306 and the Ethernet MAC/PHY time stamp server unit 370. The EBFR block 306 has a network frequency error output 316 that is functionally connected to the LTBC 302. The EBFR block 306 also has a network clock availability status output 319 that is functionally connected to the LTBC 302. The ETER 304 has a lock status output 318 and a GPS timing output 322, which are functionally connected to the LTBC 302. The GPS timing output 322 provides a time epoch reference that is a 1 pps signal that is aligned with system time.

The ETER 304 includes an assisted GPS receiver 340 that is functionally connected to the antenna system 314, the backhaul network link 312, the LTBC 302 via the GPS timing output 322 and a GPS lock status block 338 that is also part of the ETER 304. The assisted GPS receiver 340 also provides a local time signal 324 that provides time of day, which may be used by the base station for coarse logging of time. The GPS lock status block 338 is functionally connected to the LTBC 302 and to the Ethernet MAC/PHY time stamp server unit 370 via the lock status output 318.

The EBFR block 306 includes an Ethernet MAC/PHY time stamp recovery unit 342, a time stamp buffer 346, two time stamp registers 348 and 350, a slave clock counter 354, a slave clock counter controller 344, two slave clock registers 356 and 358, and three subtractors 352, 360 and 362. The backhaul network link 312 is functionally connected to the Ethernet MAC/PHY time stamp recovery unit (EMPTSRU) 342, which is also functionally connected to the slave clock counter controller 344 and the time stamp buffer 346. The slave clock counter 354 is functionally connected to the slave clock counter controller 344, the local network frequency output 317 of the LTBC 302 and the first slave clock register 356, which is also functionally connected to the second slave clock register 358. The time stamp buffer 346 is functionally connected to the first time stamp register 348, which is also functionally connected to the second time stamp register 350. Outputs of the first time stamp register 348 and the second time stamp register 350 are functionally connected to inputs of the first subtractor 352. Outputs of the first slave clock register 356 and the second slave clock register 358 are functionally connected to inputs of the second subtractor 360. An output of each of the first subtractor 352 and the second subtractor 360 is connected to respective inputs of the third subtractor 362. The third subtractor 362 provides network frequency error output 316 that is functionally connected to the LTBC 302.

The LTBC 302 includes a frequency/time lock controller 308, a digital to analog converter (DAC) 328, a temperature controlled crystal oscillator (TCXO) 310, a temperature sensor 372, a frequency divider 330, an ×16 frequency multiplier 332, a 1 pulse per second output 332 and a digital phase detector 334. The frequency/time lock controller 308 is functionally connected the frequency error output 316 of the EBFR block 306, the network clock availability status output 319 of the EBFR block 306, the lock status output 318 of the ETER 304, a GPS time error output 336 of the digital phase detector 334, a temperature information signal from the temperature sensor 372, and to the DAC 328. The DAC 328 is also functionally connected to an analog control input of the TCXO 310. Output of the TCXO 310 is functionally connected to both the frequency divider 330 and the ×16 frequency multiplier 332. The temperature sensor 372 is functionally connected to the TCXO 310. Outputs of the frequency divider 330 and the ×16 frequency multiplier 332 are functionally connected to inputs of the digital phase detector 334. The output of the frequency divider 330 is also functionally connected to the 1 pps output 332.

In operation, the EMPTSRU 342 receives network frequency information from the network communications link 312. In the embodiments shown in FIG. 3, the backhaul communications network is a packet based Ethernet network, and packets received via the network link 312 include time stamp packets from which the EMPTSRU 342 recovers time stamps that are sequentially loaded into the time stamp buffer 346. The time stamp buffer 346 then shifts the recovered time stamps sequentially through the first and second time stamp registers 348, 350 so that sequential time stamps are stored in the time stamp registers 348 and 350. The time stamps stored in the time stamp registers 348 and 350 are subtracted by the first subtractor 352 to determine the time difference between the two time stamps.

When a first time stamp packet is recovered by the EMPTSRU 342, the slave clock counter controller 344 resets and starts the slave clock counter 354, which is clocked by the local network frequency output 317 of the ×16 frequency multiplier 332. The ×16 frequency multiplier 332 multiplies the frequency of the output of the TCXO 16 times in order to provide sufficient time resolution for measurement of the inter-arrival time of time stamp packets and determination of the phase error between the GPS 1 pps timing signal 322 and the 1 pps local frequency 326, which is derived from the output of the local oscillator 310 using the divider 330. While a 16 times multiplier has been used in the implementation shown in FIG. 3, the multiplication factor is an implementation specific detail that is selected to provide sufficient time resolution for measurement of the inter-arrival time of time stamp packets on the network link.

The assisted GPS receiver 340 provides local time of day to the base station whilst the system is locked to a satellite constellation. In the event that the satellite communication is lost the GPS receiver continues to provide time of day which can be used by the base station for coarse logging of time. Provided the local frequency reference signal 326 from the 1 pps output 332 is maintained in accurate phase alignment with the phase of the GPS 1 pps signal (i.e., system time), the base station can derive accurate time from the time of day from the assisted GPS receiver 340 in combination with the 1 pps local frequency reference 326 from the 1 pps output 332.

Once started, the slave clock counter 354 begins to count up, and the count is shifted sequentially through the slave clock registers 356 and 358. Slave clock counts stored in the slave clock registers 356 and 358 are subtracted by the second subtractor 360.

The frequency/time lock controller 308 operates to set the local cell site frequency 326 by controlling the frequency of the output of the TCXO 310 using the DAC 328 based on the frequency error output 316 from the EBFR 306 or the time error output 336 from the digital phase detector 334 depending on whether or not the assisted GPS receiver 340 is currently in lock with the satellite signals, i.e., whether or not the external time epoch reference is available.

The output of the DAC 328 controls the frequency of the output of the TCXO 310. The frequency divider 330 and the ×16 frequency multiplier 332 divide and multiply the frequency of the output of the TCXO 310, respectively. The digital phase detector 334 generates its GPS timing error output 336 based on any phase error between the GPS timing output 322 and the output of the frequency divider 330, which is output as the 1 pps local frequency 326 via the 1 pps output 332. While the lock status 318 is asserted, i.e., while the assisted GPS receiver 340 is locked to a satellite signal and a valid GPS timing output 322 is being generated, the frequency/time lock controller 308 controls the TCXO 310 using the DAC 328 in order to phase-lock the TCXO 310 to the time epoch reference indicated by the GPS timing signal 322.

U.S. Pat. No. 6,711,230, which is hereby incorporated by reference in its entirety, describes the operation of a phase-locked loop (PLL) that includes a computer algorithm that adaptively models multiple frequencies of a local oscillator following a training period and updates the characteristics of the model relating to the ageing and temperature of the oscillator, using for example, a Kalman filter as an adaptive filter. By the algorithm, the subsequent model predicts the future frequency state of the oscillator on which it is trained. The predicted frequency of the model functions as a reference to correct the frequency of the oscillator in the event that no input reference timing signal is available. U.S. Pat. No. 7,015,762, which is also incorporated by reference herein, discloses a similar technique, in which a cumulative phase error of the PLL is calculated during a given time interval and the calculated phase error is stored and used to correct the frequency of the oscillator while no input reference timing signal or accurate predicted frequency value is available.

In some embodiments, the frequency/time controller block 308 also implements an adaptive oscillator model in accordance with prior art U.S. Pat. No. 6,711,230, which is hereby incorporated by reference in its entirety. The adaptive oscillator model uses the time error signal 336 and the temperature sensor signal 351 to create a model of the time and temperature dependent frequency variation of the TCXO 310. In the event that satellite signal is lost and there is no network frequency reference available, the adaptive oscillator model is employed to maintain the phase alignment of the TCXO 310 with the GPS signal through application of frequency corrections to the TCXO 310 in accordance with the model output. The availability of the network frequency reference is provided to the frequency/time lock controller 308 by the Ethernet MAC/PHY time stamp recovery unit 342 via its network frequency reference availability status output 319.

The functionality of the EBFR block 306 in FIG. 3 is similar to the technique for synchronizing clocks in a network described in U.S. Pat. No. 7,043,651, which is hereby incorporated by reference in its entirety.

If the local network frequency 326 generated by the ×16 frequency multiplier 332 and the network frequency of the backhaul Ethernet network are the same, i.e., frequency-locked, and phase-aligned, i.e. phase-locked, then they are synchronized and the difference between the count in the first slave clock register 356 and the count in the second slave clock register 358 should correspond to the difference between the time stamp stored in the first time stamp register 348 and the time stamp stored in the second time stamp register 350.

If the local network frequency 317 generated by the ×16 frequency multiplier 332 is different from the network frequency, the difference between the slave clock counts stored in the slave clock registers 356 and 358 may not accurately correspond to the difference in the time stamps stored in the time stamp registers 348 and 350, and this frequency error will be indicated in the frequency error output 316 of the third subtractor 362.

In this manner the frequency/time lock controller 308 can monitor any frequency offsets between the local network frequency 317 and the network frequency reference of packets received via the network link 312, and can determine frequency corrections that lock the local network frequency 317 to the network frequency reference.

By determining these frequency corrections while the local frequency output 326 of the divider 330, which is derived from the output of the TCXO 310, is phase-locked to the 1 pps GPS timing 322, i.e., phase-locked to the time epoch reference recovered by the ETER 304, the frequency/time lock controller 308 effectively determines phase corrections that would align the phases of the network frequency reference and the external time epoch reference. In other words, during GPS locked mode, i.e., while the output of the divider 330 is phase-locked to the GPS timing 322 recovered by the ETER 304, the frequency/time lock controller 308 trains a network frequency variation model using the frequency corrections between the local network frequency 317.

Accordingly, if the external time epoch reference is lost or unavailable, i.e. holdover mode, the frequency/time lock controller 308 is able to remain synchronized with system time, i.e., the external time epoch, by compensating for the measured network frequency error 316 using frequency corrections determined from the network frequency variation model that was developed while the time epoch reference was available and the local frequency output 326 of the divider 330 was phase-locked to the 1 pps GPS timing 322 recovered by the ETER 304.

In effect, the frequency/time controller 308 implements an adaptive control algorithm that, once the local frequency output 326 of the divider 330, and hence the output of the TCXO 310, has been phase-locked to the GPS timing 322, averages out network frequency reference jitter and models drift characteristics of the network frequency reference, so that this model can be used to correct for frequency offsets between the local frequency, which is aligned with system frequency and phase, and network frequency when the network frequency reference is available but the external time epoch reference is unavailable. Typically, the network frequency reference of a backhaul network is traceable to a GPS disciplined frequency standard, and therefore the holdover for the time synchronization can be maintained for the duration for which the network connection 312 is maintained.

In some embodiments, if the local network frequency 317, which is derived from the output of the TCXO 310 using the ×16 frequency multiplier 332, deviates from the network frequency reference beyond a threshold value, an error signal (not shown) is generated and the frequency/time lock controller 308 will compensate for this deviation by serving the frequency of the TCXO 310 via the DAC 328.

In FIG. 3, the ETER 304, is assisted GPS based, and therefore, in addition to receiving satellite signals via the antenna system 314, the assisted GPS receiver 340 may also receive satellite data via the network link 312 (e.g. Ethernet satellite data packets) that assist in the reception of satellite signals. However, the ETER 204 may also operate satisfactorily without the use of network assistance information. The assisted GPS receiver 340 generates a GPS timing reference on its GPS timing output 322, and the GPS lock status block 338 indicates via its lock status output 318 whether or not the GPS timing output 322 is valid based on whether or not the assisted GPS receiver 340 is locked to a GPS signal.

As noted above, some embodiments include a MAC/PHY time server unit, such as the Ethernet MAC/PHY time stamp server unit 370. In these embodiments, when a network frequency reference can be determined from line signals received via the network backhaul link 312 and a valid external time epoch reference has been determined from external epoch time reference signals received via the ETER 304 (indicated by the GPS lock signal 318) and the frequency/time lock controller 308 has achieved synchronisation of the TCXO 310 with the external time epoch reference, the Ethernet MAC/PHY time stamp server unit 370 may send time stamp packets (or other synchronising signals) over the interconnecting communications network via the backhaul network link 312 to be used by other nodes in the network for their synchronisation. As noted above with reference to FIG. 2, this technique has the advantage that there may be no need for a dedicated time synchronisation node in the network to issue the time stamp packets.

In some embodiments, the assisted GPS receiver 340 may be replaced with a receiver that receives signals from other cell sites in a mobile communications network.

Figure 4:
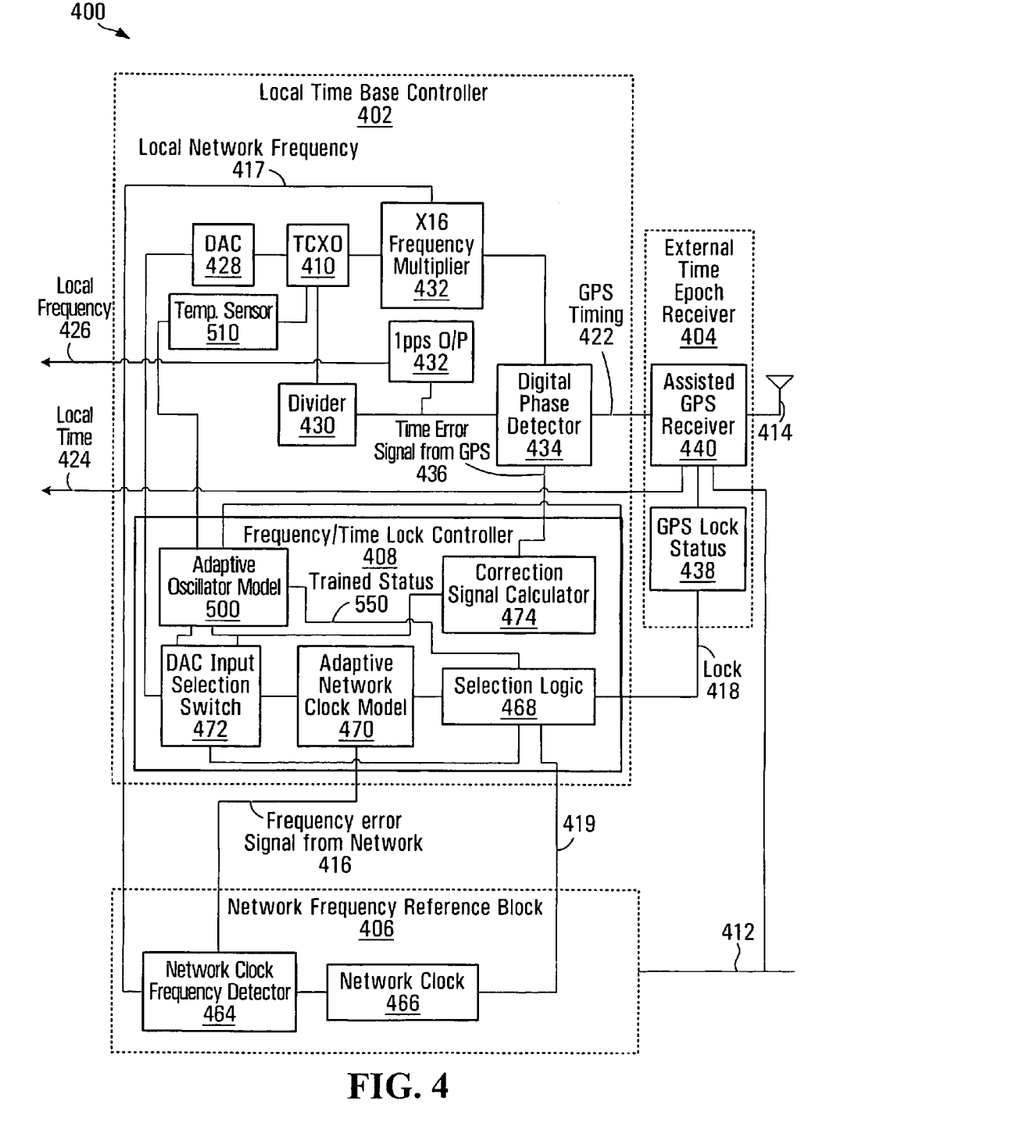
FIG. 4 is a block diagram of base station components arranged according to yet another embodiment of the invention.

FIG. 4 is a block diagram of an arrangement 400 of time synchronization elements in a base station according to yet another embodiment of the invention. Similar to the arrangement 300 shown in FIG. 3, the arrangement 400 shown in FIG. 4 includes an external time epoch receiver (ETER) 404 that is functionally connected to an antenna system 414. The arrangement 400 includes a local time base controller (LTBC) 402 that is functionally connected to the ETER 404, and a network frequency reference (NFR) block 406 that is functionally connected to the LTBC 402. The arrangement 400 also includes a backhaul network connection 412 that is functionally connected to the NFR block 406 and the ETER 404.

The ETER 404 is similar to the ETER 304 shown in FIG. 3, and includes an assisted GPS receiver 440 and a GPS lock status block 438 that are arranged in the same manner as the assisted GPS receiver 340 and the GPS lock status block 338 shown in FIG. 3. Similarly, the LTBC 402 includes a frequency/time lock controller 408, a DAC 428, a TCXO 410, a TCXO temperature sensor 510, a frequency divider 430, a 1 pulse per second output 432, an ×16 frequency multiplier 432, and a digital phase detector 434 arranged in the same manner as the corresponding components in the arrangement shown in FIG. 3. However, FIG. 4 includes an exemplary arrangement of functional blocks of the frequency/time lock controller 408 that implement the adaptive control algorithm described above with reference to FIG. 3.

Specifically, the frequency/time lock controller 408 shown in FIG. 4 includes a correction signal calculator 474, selection logic 468, an adaptive network clock model 470, adaptive oscillator model 500 and a digital to analog (DAC) input selection switch 472.

The correction signal calculator 474 is functionally connected to the output of the digital phase detector 434, to a first input of the DAC input selection switch 472 and to a first input of the adaptive oscillator model 500.

The DAC input selection switch 472 has a second input that is functionally connected to an output of the adaptive network clock model 470 and a third input that is connected to a first output of the adaptive oscillator model 500. The DAC input selection switch 472 also has a control input that is functionally connected to an output of the selection logic 468, and an output that is functionally connected to the DAC 428.

The adaptive network clock model 470 has a first input that is functionally connected to a time error output 416 from the NFR block 406, and a second input that is functionally connected to a second output of the selection logic 468.

The adaptive oscillator model 500 has a second input that is functionally connected to the temperature sensor 510 located so as to sense the temperature of the TCXO 410 and a third input that is functionally connected to the GPS lock status block 438 to receive GPS lock status 418. The adaptive oscillator model 500 has a second output that is functionally connected to an input of the selection logic block 468 to provide a model training status signal 550.

The selection logic 468 has a second input that is functionally connected to the GPS lock status block 438 to receive GPS lock status 418 and a third input that is functionally connected to the network frequency reference block 406 to receive network clock availability status 419.

The NFR block 406 includes a network clock block 466 and a network clock frequency detector 464 that is functionally connected to the network clock block 466, and to the local network frequency output 417 of the ×16 frequency multiplier 432. The network clock block 466 is functionally connected to the third input of the selection logic 468 to provide the network frequency reference availability status 419. The NFR block 406 operates in a manner similar to the EBFR block 306 shown in FIG. 3. The NFR block 406 receives a backhaul network line signal from the network connection 412 and the network clock block 466 recovers a network clock frequency reference from the network line signal. The network clock frequency detector 464 determines the frequency offset between the local network frequency output 426 and the network frequency reference output of the network clock block 466 and reports this frequency offset to the adaptive network clock model 470 of the frequency/time lock controller 408 via the frequency error output 416. The network clock block 466 reports the availability of the network frequency reference to the selection logic block 468 via the network frequency availability status signal 419.

If the assisted GPS receiver 440 receives a valid external time epoch reference via the antenna system 414, the assisted GPS receiver 440 notifies the GPS lock status block 438 that it has locked to an external time epoch reference signal and the GPS lock status block 438 asserts its lock output 418. When the lock output 418 of the GPS lock status block 438 is asserted indicating that a valid GPS timing 422 is available, the selection logic 468 causes the DAC input selection switch 472 to pass the output of the correction signal calculator 474 to the DAC 428. The correction signal calculator 474 calculates a control value for the DAC 428 based on the phase offset between the GPS timing 422 and the output of the frequency divider 430, so that the output of the divider 430 is brought into phase alignment with the GPS timing 422. This effectively phase-locks the local frequency 426 from the 1 pps output 432 to the GPS timing 422. The assisted GPS receiver 440 also provides a local time signal 424 that may be used for coarse time logging, as described above with reference to FIG. 3.

Effectively, while the external time epoch reference is available and the valid lock signal 418 is asserted, the TCXO 410 is controlled by the frequency/time lock controller 408 based on the GPS timing 422 from the assisted GPS receiver 440.

The selection logic 468 also passes the valid lock signal 418 to the adaptive network clock model 470, and while the valid lock signal 418 is asserted, the adaptive network clock model is trained using the frequency error signal 416 to predict frequency correction values that compensate for any frequency offsets between system frequency, i.e. an external reference frequency provided by the external time epoch reference signals, and network frequency.

If the external time epoch reference is unavailable, the lock status 418 will be de-asserted. If the network clock frequency reference is available from a backhaul network signal then the frequency/time lock controller 408 will switch over to the backhaul network signal to maintain synchronization with system time by having the selection logic 468 cause the DAC input selection switch 472 pass the output of the adaptive network clock model 470 to the DAC 428. While the lock status 418 is de-asserted, the adaptive network clock model 470 generates frequency correction values that are based on the training received during the locked mode. Effectively, during the training period, i.e. during the locked mode, the adaptive network clock model 470 is trained to produce frequency correction values based on the frequency error signal 416 that will correct for frequency offsets between the network frequency reference and the local network frequency reference 417.

If the external time epoch reference is unavailable and the network frequency reference is unavailable and the adaptive oscillator model 500 is trained (indicated by the trained status signal 550), then the selection logic 468 selects the DAC control output of the adaptive oscillator model 470 as the input to the DAC 428. The adaptive oscillator model 470 generates correction values based on the model developed during training whilst the system is locked to the external time epoch reference signal. During holdover, the adaptive oscillator model 470 uses temperature sensor values from the temperature sensor 510 to determine TCXO correction values based on the model developed during locked mode operation of the system.

If the adaptive oscillator model 470 is insufficiently trained and the network frequency reference is unavailable and the system enters holdover, then the selection logic 468 selects the correction signal calculator 474 which is locked at the last correction value prior to holdover.

In practice, a frequency/time lock controller, such as the frequency/time lock controllers 202, 302 and 402 shown in FIGS. 2, 3 and 4, respectively, might be implemented using hardware, software, firmware or combinations thereof.

A method for using backhaul frequency synchronization in a base station to augment time synchronization in accordance with an embodiment of the present invention will now be described with reference to FIG. 5.

Figure 5:
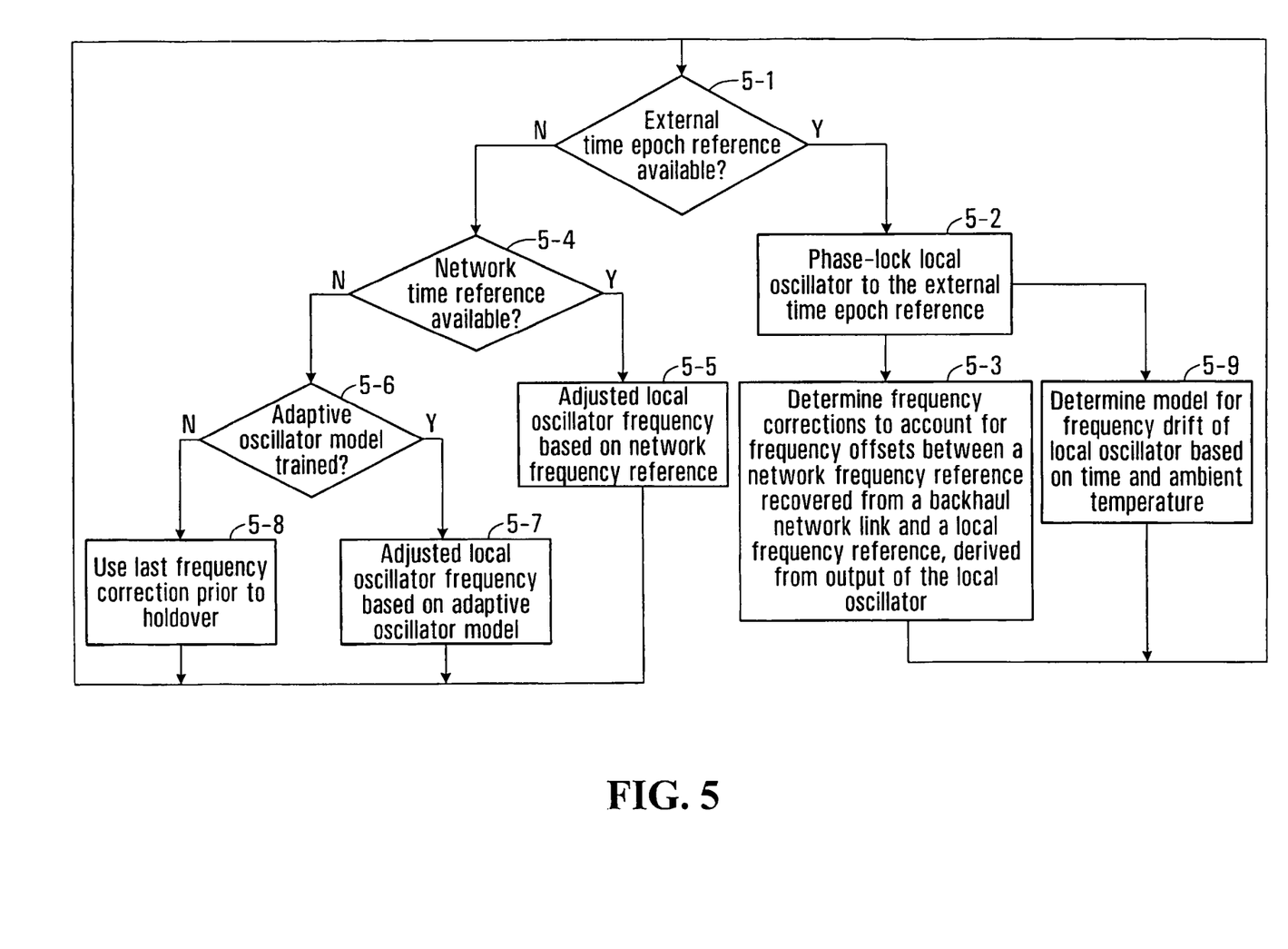
FIG. 5 is a flowchart of an example of a method of time synchronizing a base station according to an embodiment of the invention.

The method illustrated in FIG. 5 begins at step 5-1, in which it is determined if an external time epoch reference is available. The external time epoch reference may be a GNSS signal such as a GPS signal, or a signal from another base station within the same communications network.

Upon determining that an external time epoch reference is available, the method proceeds to step 5-2 (yes path), in which a local oscillator is controlled based on the external time epoch reference to phase-lock output of local oscillator the external time epoch reference.

In step 5-3, while the local oscillator is phase-locked to the external time epoch reference, frequency corrections are determined to account for frequency offsets between a backhaul network frequency reference and a local network frequency reference derived from output of the phase-locked local oscillator.

In step 5-9, which is executed while the local oscillator is phase-locked to the external time epoch reference, an adaptive oscillator model is determined for frequency drift of the local oscillator based on time (i.e. age) and temperature.

Upon determining that the external time epoch reference is not available in step 5-1, the method proceeds to step 5-4 (no path), in which it is determined if a network frequency reference is available. If the network frequency reference is available the method proceeds to step 5-5.

In step 5-5 the local oscillator is controlled based on current frequency errors between the network frequency reference and the local network frequency reference and the frequency corrections determined while the external time epoch reference is available and the local oscillator is phase-locked to the external time epoch reference, so that the local oscillator remains phase-locked to the time epoch reference.

If the network frequency reference is unavailable then the method proceeds to step 5-6. In step 5-6 it is determined if the adaptive oscillator model is trained or not. If the adaptive oscillator model has been trained, i.e. converged to a sufficiently accurate solution to meet the holdover time accuracy requirements of the system, then the method proceeds to step 5-7.

In step 5-7 the adaptive oscillator model is used to correct the local oscillator during the holdover period.

If in step 5-6 it is determined that the adaptive oscillator model has not converged to a sufficiently accurate solution, then the method proceeds to step 5-8 in which the value of the frequency control input of the local oscillator is held at the last value prior to entering holdover. In some embodiments, the local oscillator is controlled via a digital to analog converter (DAC), and the output of the DAC is locked in step 5-6 to maintain a constant output value.

In some embodiments, determining the frequency corrections in step 5-3 includes training an adaptive network clock model using frequency offsets between the network frequency reference and the local network frequency reference, so that the adaptive network clock model generates frequency corrections to account for the frequency offsets.

In the embodiments described above, the device elements and circuits are connected to each other as shown in the Figures, for the sake of simplicity. In practical applications of the present invention, elements, circuits, etc. may be connected directly to each other. As well, elements, circuits etc. may be connected indirectly to each other through other elements, circuits, etc., necessary for operation of the devices or apparatus. Thus, in actual configuration of devices and apparatus, the elements and circuits are directly or indirectly coupled with or connected to each other.

While the embodiments have been described in the context of femtocell's, more generally embodiments of the present invention may be implemented in any base station application including, but not limited to WiMAX, 4G, CDMA, femtocell, and Wideband CDMA Long Term Evolution (LTE) base stations.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. A method comprising:
at a base station:
deriving a local network frequency reference from an output of a local oscillator;
while in a first mode,
adjusting the local oscillator based on an external time epoch reference, and
when a network frequency reference received via a backhaul connection distinct from said external time epoch reference is available, determining frequency corrections to account for frequency offsets between the network frequency reference and the local network frequency reference; and
while in a second mode,
when the network frequency reference is available, adjusting the local oscillator based on:
i) the frequency corrections determined while in the first mode, and
ii) frequency offsets between the network frequency reference and the local network frequency reference.

2. The method of claim 1, further comprising operating in the second mode when the external time epoch reference is unavailable.

3. The method of claim 1, wherein:
determining frequency corrections comprises training a network clock model to predict frequency corrections that account for frequency offsets between the network frequency reference and the local frequency reference; and
adjusting the local oscillator while in the second mode comprises adjusting the local oscillator based on:
i) the network clock model; and
ii) frequency offsets between the network frequency reference and the local network frequency reference while in the second mode.

4. The method of claim 1, further comprising:
while in the first mode,
training an oscillator model for a frequency drift of the local oscillator based on at least one of time and temperature; and
while in the second mode,
when the network frequency reference is unavailable, and the oscillator model has been sufficiently trained while in the first mode, adjusting the local oscillator based on the trained oscillator model;
otherwise, maintaining a last frequency correction applied to the local oscillator.

5. The method of claim 4, wherein:
training the oscillator model for the frequency drift of the local oscillator based on at least one of time and temperature comprises measuring a temperature of the local oscillator; and
adjusting the local oscillator based on the trained oscillator model while in the second mode comprises calculating frequency corrections for the local oscillator based on the measured temperature of the local oscillator using the trained oscillator model.

6. The method of claim 4, wherein:
training the oscillator model for the frequency drift of the local oscillator based on at least one of time and temperature comprises measuring an elapsed time while in the second mode; and
adjusting the local oscillator based on the trained oscillator model while in the second mode comprises calculating frequency corrections for the local oscillator based on the elapsed time while in the second mode using the trained oscillator model.

7. The method of claim 1, wherein adjusting the local oscillator based on the external time epoch reference comprises:
receiving the external time epoch reference; and
phase-locking the local oscillator to the external time epoch reference.

8. The method of claim 7, wherein receiving the external time epoch reference comprises:
receiving a Global Navigation Satellite System (GNSS) signal; and
recovering a GNSS timing signal from the GNSS signal.

9. The method of claim 8, wherein phase-locking the local oscillator to the external time epoch reference comprises:
deriving a local frequency reference from an output of the local oscillator;
determining phase corrections between the local frequency reference and the recovered GNSS timing signal; and
adjusting the local oscillator based on the phase corrections.

10. The method of claim 1, wherein determining frequency corrections to account for frequency offsets between the frequency reference and the local network frequency reference comprises recovering the network frequency reference from a backhaul network link.

11. The method of claim 8, wherein:
receiving the external time epoch reference further comprises receiving GNSS data from a backhaul network link; and
recovering the GNSS timing signal from the GNSS signal comprises recovering the GNSS timing signal from at least one of the GNSS signal and the GNSS data received from the backhaul network link.

12. The method of claim 8, further comprising:
determining location information from the GNSS signal; and
determining a delay from a main base station using the location information.

13. The method of claim 7, wherein receiving the external time epoch reference comprises receiving a signal from another base station.

14. The method of claim 13, wherein receiving a signal from another base station comprises receiving a code division multiple access (CDMA) coded signal that is similar to a Global Navigation Satellite System (GNSS) signal from another base station.

15. The method of claim 13, wherein:
the base station is associated with a femtocell; and
receiving the signal from another base station comprises receiving the signal from a main base station.

16. The method of claim 7, wherein:
the base station operates in a time division duplexing mode; and phase-locking the local oscillator to the external time epoch reference comprises using the external time epoch reference when the base station is not transmitting.

17. The method of claim 1, further comprising, while in the first mode, transmitting time stamp packets over a backhaul network link.

18. An apparatus associated with a base station, the apparatus comprising:
a network frequency reference component that while a network frequency reference is available recovers the network frequency reference;
an external time epoch receiver that while an external time epoch reference is available recovers the external time epoch reference; and
a local time base controller comprising a local oscillator and a frequency/time lock controller, wherein the local time base controller derives a local network frequency reference from an output of the local oscillator; and
while in a first mode, the frequency/time lock controller:
adjusts the local oscillator based on the external time epoch reference; and
when a network frequency reference received via a backhaul connection distinct from said external time epoch reference is available, determines frequency corrections to account for frequency offsets between the network frequency reference and the local network frequency reference; and
while in a second mode, the frequency/time lock controller adjusts the local oscillator when the network frequency reference is available, based on:
i) the frequency corrections determined while in the first mode, and
ii) the frequency offsets between the network frequency reference and the local network frequency reference.

19. The apparatus of claim 18, wherein the apparatus operates in the second mode when the external time epoch reference is unavailable.

20. The apparatus of claim 18, wherein the frequency/time lock controller comprises a network clock model; and
while in the first mode, the frequency/time lock controller:
trains the network clock model to predict frequency corrections that account for frequency offsets between the network frequency reference and the local network frequency reference; and
adjusts the local oscillator based on the network clock model and the frequency offsets between the network frequency reference and the local network frequency reference.

21. The apparatus of claim 18, wherein the frequency/time lock controller comprises an oscillator model; and
while in the first mode, the frequency/time lock controller:
trains the oscillator model for a frequency drift of the local oscillator based on at least one of time and temperature; and
while in the second mode, the frequency/time lock controller:
when the network frequency reference is unavailable, and the oscillator model has been sufficiently trained while in the first mode, adjusts the local oscillator based on the trained oscillator model;
otherwise, maintains a last frequency correction applied to the local oscillator.

22. The apparatus of claim 18, wherein the external time epoch receiver comprises:
an assisted Global Navigation Satellite System (GNSS) receiver that recovers the external time epoch reference by receiving at least one of:
a GNSS signal from at least one Global Navigation Satellite; and
GNSS data received from a backhaul network link; or
a portion of a wireless transceiver that the base station uses to communicate with mobile terminals and other base stations.

23. A non-transitory computer-readable medium storing executable instructions that, when executed by one or more processors, cause a base station to:
derive a local network frequency reference from an output of a local oscillator;
while in a first mode,
adjust the local oscillator based on an external time epoch reference, and
when a network frequency reference received via a backhaul connection distinct from said external time epoch reference is available, determine frequency corrections to account for frequency offsets between the network frequency reference and the local network frequency reference; and
while in a second mode,
when the network frequency reference is available, adjust the local oscillator based on:
i) the frequency corrections determined while in the first mode, and
ii) frequency offsets between the network frequency reference and the local network frequency reference.

* * * * *

UNITED STATES PATENT AND TRADEMARK OFFICE
CERTIFICATE OF CORRECTION

PATENT NO. : 8,867,520 B2
APPLICATION NO. : 12/044279
DATED : October 21, 2014
INVENTOR(S) : Charles Nicholls et al.

Page 1 of 1

It is certified that error appears in the above-identified patent and that said Letters Patent is hereby corrected as shown below:

In the Claims:

Column 17, line 48 (Claim 3, line 10): "frequency offsets" should read --the frequency offsets--.

Signed and Sealed this
Sixth Day of January, 2015

Michelle K. Lee
*Deputy Director of the United States Patent and Trademark Office*